(12) United States Patent
Sakurai et al.

(10) Patent No.: US 8,154,627 B2
(45) Date of Patent: Apr. 10, 2012

(54) IMAGING DEVICE

(75) Inventors: Junzou Sakurai, Tokyo (JP); Takanori Miki, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 641 days.

(21) Appl. No.: 12/113,229

(22) Filed: May 1, 2008

(65) Prior Publication Data

US 2009/0167903 A1    Jul. 2, 2009

(30) Foreign Application Priority Data

Dec. 28, 2007   (JP) ................................ 2007-340415

(51) Int. Cl.
*H04N 5/217*     (2006.01)
*H04N 5/335*     (2006.01)
*H04N 5/228*     (2006.01)

(52) U.S. Cl. ..................... 348/241; 348/222.1; 348/272; 348/273

(58) Field of Classification Search ............... 348/222.1, 348/266, 272, 273, 276, 277, 278, 279, 280, 348/241
See application file for complete search history.

(56) References Cited

U.S. PATENT DOCUMENTS

| 7,133,070 B2 * | 11/2006 | Wheeler et al. | 348/223.1 |
| 7,456,866 B2 * | 11/2008 | Hirose | 348/222.1 |
| 2003/0095717 A1 * | 5/2003 | Gindele et al. | 382/260 |
| 2004/0257451 A1 * | 12/2004 | Yamamoto | 348/207.99 |
| 2007/0230779 A1 * | 10/2007 | Sato | 382/167 |

FOREIGN PATENT DOCUMENTS

| JP | 2004096610 | 3/2004 |
| JP | 2007013275 | 1/2007 |

\* cited by examiner

*Primary Examiner* — David Ometz
*Assistant Examiner* — Peter Chon
(74) *Attorney, Agent, or Firm* — Pedro P. Hernandez; Peyton C. Watkins

(57) ABSTRACT

To improve sensitivity by adding pixels, and improve precision of pixel interpolation in an imaging device.
An imaging device is provided in which pixels are added along a horizontal direction or a vertical direction to improve sensitivity of an imaging element. An R pixel signal, a G pixel signal, and a B pixel signal in which pixels are added, for example, along the vertical direction are output from a CCD (12). A CFA interpolation unit (24) interpolates the G pixel signal using an adjacent pixel along the horizontal direction. The CFA interpolation unit (24) also interpolates the R pixel signal and the B pixel signal along the horizontal direction using an adjacent pixel along the horizontal direction and interpolates along the vertical direction using correlation of the interpolated G pixel.

3 Claims, 13 Drawing Sheets

IMAGING DEVICE

CROSS REFERENCE TO RELATED APPLICATIONS

This application claims priority to Japanese Patent Application No. 2007-340415 filed on Dec. 28, 2007, which is incorporated herein by reference in its entirety.

FIELD OF THE INVENTION

The present invention relates to an imaging device, and in particular, to pixel interpolation in an imaging device.

BACKGROUND OF THE INVENTION

In addition to the interpolation process such as pixel interpolation, removal of noise included in a pixel signal is required. Noise can be removed using a plurality of pixels at a periphery of a position of a pixel to be processed. For example, noise is removed using a total of 4 pixels including two pixels at the periphery of the position of the pixel to be processed along the horizontal direction and two pixels at the periphery of the position of the pixel to be processed along the vertical direction or a total of 4 pixels in the diagonal directions of the position of the pixel to be processed. However, when a noise removal process is executed on the image data in which the pixels are added along the horizontal direction or along the vertical direction by simply using the pixels at the periphery of the position of the pixel to be interpolated, noise cannot be accurately removed. This is because the resolution differs between the horizontal direction and the vertical direction, and consequently, a degree of influence or a degree of correlation with respect to the position of the pixel to be processed differs between these directions. In addition, with the noise removal, the degree of degradation of resolution changes between the horizontal direction and the vertical direction, possibly resulting in an unnatural image.

SUMMARY OF THE INVENTION

One object of the present invention is to provide an imaging device in which noise can be precisely removed for image data obtained by adding pixels along the horizontal direction or the vertical direction.

According to one aspect of the present invention, there is provided an imaging device comprising an imaging element, a reading unit which reads a pixel signal from the imaging element while adding a plurality of the pixel signals along a horizontal direction or a vertical direction and outputs as an R pixel signal, a G pixel signal, and a B pixel signal, and a noise filter unit which removes noise in the R pixel signal, the G pixel signal, or the B pixel signal or noise in a brightness signal generated from the R pixel signal, the G pixel signal, and the B pixel signal, using a peripheral pixel of a pixel to be processed, wherein a pixel spacing of a peripheral pixel from the pixel to be processed is set smaller along a direction of addition among the horizontal direction and the vertical direction than along a direction which is not the direction of the addition among the horizontal direction and the vertical direction.

According to another aspect of the present invention, there is provided an imaging device comprising an imaging element, a reading unit which reads a pixel signal from the imaging element while adding a plurality of the pixel signals along a horizontal direction or a vertical direction and outputs as an R pixel signal, a G pixel signal, and a B pixel signal, and a noise filter unit which removes noise in the R pixel signal, the G pixel signal, or the B pixel signal, or noise in a brightness signal generated from the R pixel signal, the G pixel signal, and the B pixel signal, using a peripheral pixel of a pixel to be processed, wherein a weight of a peripheral pixel is set smaller along the direction of the addition, among the horizontal direction and the vertical direction, than along a direction which is not the direction of the addition among the horizontal direction and the vertical direction.

ADVANTAGE

According to the present invention, noise can be precisely removed without unnatural feeling due to difference in the resolution between the horizontal and vertical directions for image data obtained by adding pixels along the horizontal direction or the vertical direction.

BRIEF DESCRIPTION OF THE DRAWINGS

Preferred embodiments of the present invention will be described in detail by reference to the drawings, wherein.

DETAILED DESCRIPTION OF THE INVENTION

A preferred embodiment of the present invention will now be described with reference to the drawings and exemplifying a digital camera as an imaging device.

Figure 1:
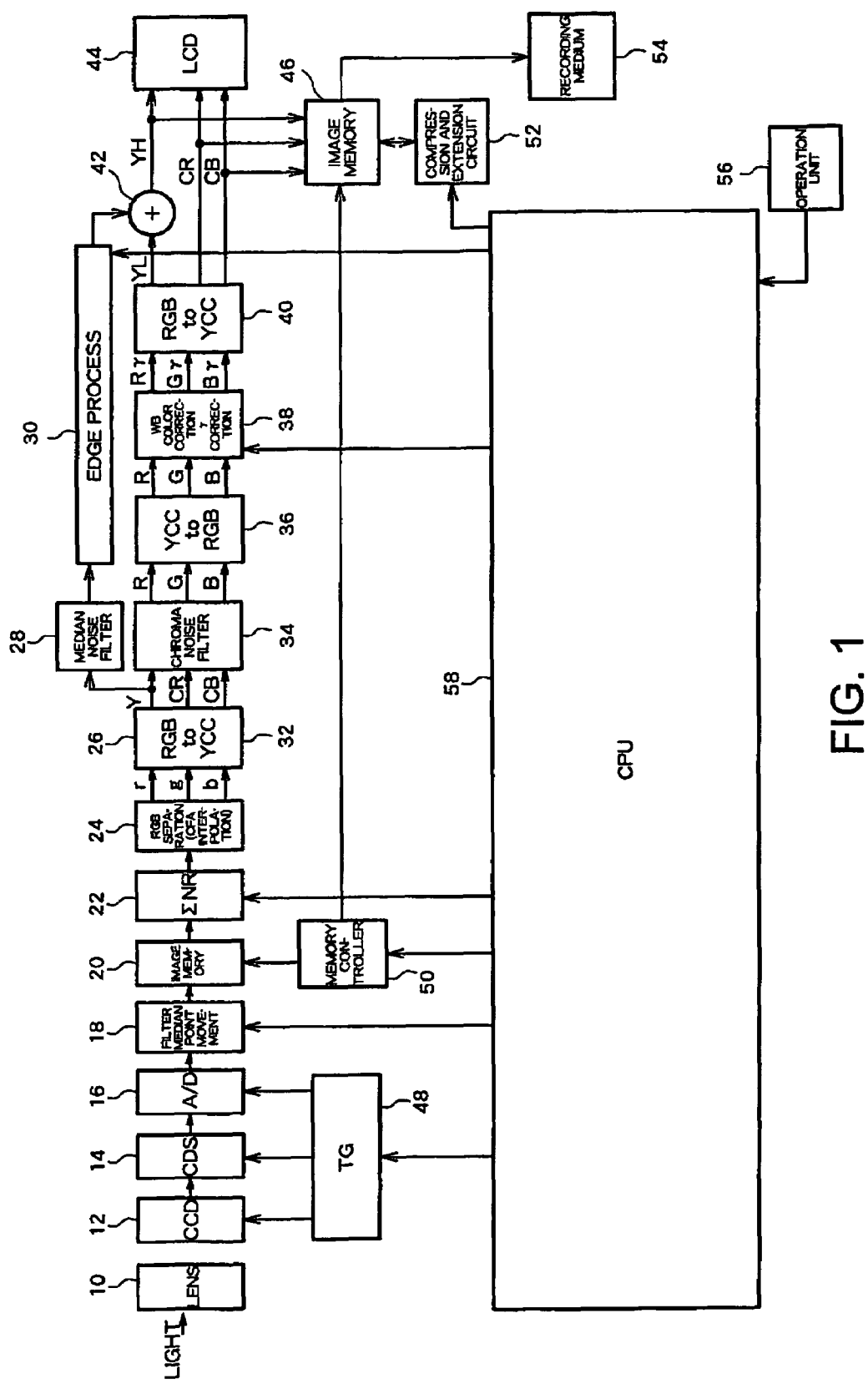
FIG. 1 is a block diagram showing a structure in a preferred embodiment of the present invention.

FIG. 1 is a block diagram showing a structure of a digital camera in a preferred embodiment of the present invention. An optical system such as a lens 10 forms an image of light from an object on an imaging element. The lens 10 includes a zoom lens or a focus lens, and the optical system further includes a shutter and an iris.

A CCD 12 converts an object image formed by the optical system into an electric signal and outputs the electric signal as an image signal. The CCD 12 has a color filter array of a Bayer arrangement. Timing for reading of the image signal from the CCD 12 is set by a timing signal from a timing generator (TG). Alternatively, a CMOS may be used as the imaging element in place of the CCD.

A CDS 14 executes a correlated double sampling process on an image signal from the CCD 12 and outputs the processed signal.

An A/D 16 converts the image signal sampled by the CDS 14 into a digital image signal and outputs the digital image signal. The digital image signal comprises color signals, that is, an R pixel signal, a G pixel signal, and a B pixel signal.

A filter median point movement filter 18 converts an image signal, when the median points of image signals which are read from the CCD 12 do not match each other, so that the median points match each other for later processes. When the median points of the image signals which are read from the CCD 12 match each other, the filter median point movement filter 18 allows the input image signal to pass through the filter. In other words, the filter median point movement filter 18 is switched between an operation state and a non-operation state according to the reading method from the CCD 12.

An image memory 20 stores image data.

A sigma (Σ) noise filter 22 removes noise in the image data.

A CFA interpolation unit 24 interpolates the R pixel, G pixel, and B pixel, and outputs as an r pixel signal, a g pixel signal, and a b pixel signal.

A brightness and color difference conversion unit 26 converts the r pixel signal, g pixel signal, and b pixel signal in which interpolation is applied to the pixels into a brightness signal Y and color difference signals CR and CB, and outputs the resulting signals.

A median noise filter 28 removes noise in the brightness signal Y.

An edge processing unit 30 executes a process to enhance an edge of the brightness signal Y from which the noise is removed.

A chroma noise filter 34 is a low-pass filter, and removes noise in the color difference signals CB and CR.

An RGB conversion unit 36 re-generates, from the brightness signal Y and the color difference signals from which the noise is removed, an R pixel signal, a G pixel signal, and a B pixel signal.

A WB (white balance)/color correction/γ correction unit 38 applies a white balance correction, a color correction and a γ correction to the R pixel signal, G pixel signal, and B pixel signal. The white balance correction, color correction, and γ correction are known techniques, and will not be described here.

A brightness and color difference conversion unit 40 again converts the R pixel signal, G pixel signal, and B pixel signal to which various processes are applied into a brightness signal Y and color difference signals CB and CR, and outputs the resulting signals.

An adder 42 adds the brightness signal in which the edge is enhanced by the edge processing unit 30 and the brightness signal from the brightness and color difference conversion unit 40, and outputs the resulting signal as a brightness signal YH.

An image memory 46 stores the brightness signal YH from the adder 42 and the color difference signals CB and CR from the brightness and color difference conversion unit 40.

A compression and extension circuit 52 compresses the brightness and color difference signals stored in the image memory 46 and stores on a recording medium 54 or extends compressed data and stores in the image memory 46.

An LCD 44 displays the image data stored in the image memory 46. The LCD 44 displays a preview image or an imaged image.

An operation unit 56 includes a shutter button and various mode selection buttons. The operation unit 56 may be constructed with a touch panel.

A memory controller 50 controls writing and reading of the image memories 20 and 46.

A CPU 58 controls operations of various units. More specifically, the CPU 58 controls the timing generator TG 48 according to an operation signal from the operation unit 56 to start reading of signals from the CCD 12, and controls the memory controller 50 to control writing to and reading from the image memory 20. In addition, the CPU 58 controls the operations of the image memory 46 and the compression and extension circuit 52 to write an image that has been subjected to a compression process to the recording medium 54, or read data from the recording medium 54 so that the extension process is applied to the data and an image is displayed on the LCD 44. When the user selects a particular mode, the CPU 58 controls the white balance according to the selection.

The filter median point movement filter 18 in FIG. 1 will next be described.

Figure 2:
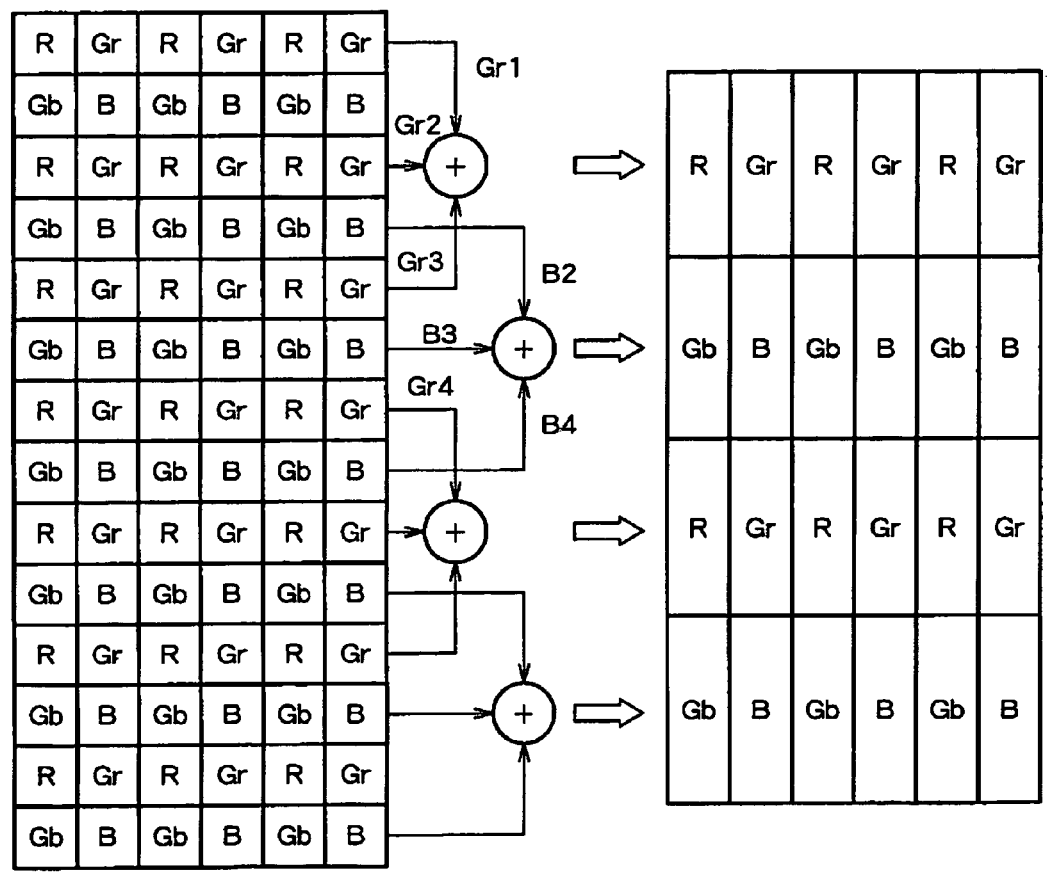
FIG. 2 is a diagram for explaining reading from a CCD.

FIG. 2 shows a first method of reading from the CCD 12. This is a case where the pixels are added along the vertical direction and the data is read in order to improve the sensitivity of the CCD 12. As already described, the CCD 12 has a color filter array of Bayer arrangement in which R pixels (represented by R in the figure), G pixels (represented by Gr and Gb in the figure), and B pixels (represented by B in the figure) form a predetermined arrangement. The pixel Gr is a G pixel which is positioned on the same row as the R pixel and the pixel Gb is a G pixel which is positioned on the same row as the B pixel. With regard to the G pixel, three G pixels positioned along the vertical direction are added to form one G pixel. With regard to the R pixel, similar to the G pixel, three R pixels positioned along the vertical direction are added to form one R pixel. With regard to the B pixel, three B pixels positioned along the vertical direction are added to form one B pixel. Even after the addition along the vertical direction, similar to the configuration before the pixel addition, the median point of the Gr pixel and the R pixel and the median point of the Gb pixel and the B pixel are arranged equidistantly. In this case, the filter median point movement filter 18 may allow the input image signal to pass through. In other words, in this case, the filter 18 is set to an OFF state (non-operation state). In FIG. 2, the pixels before the pixel addition are shown with squares while the pixels after the pixel addition along the vertical direction are shown with rectangles (rectangles having a longer vertical side than horizontal side), in order to show that the resolution in the vertical direction is lower than the resolution in the horizontal direction.

Figure 3:
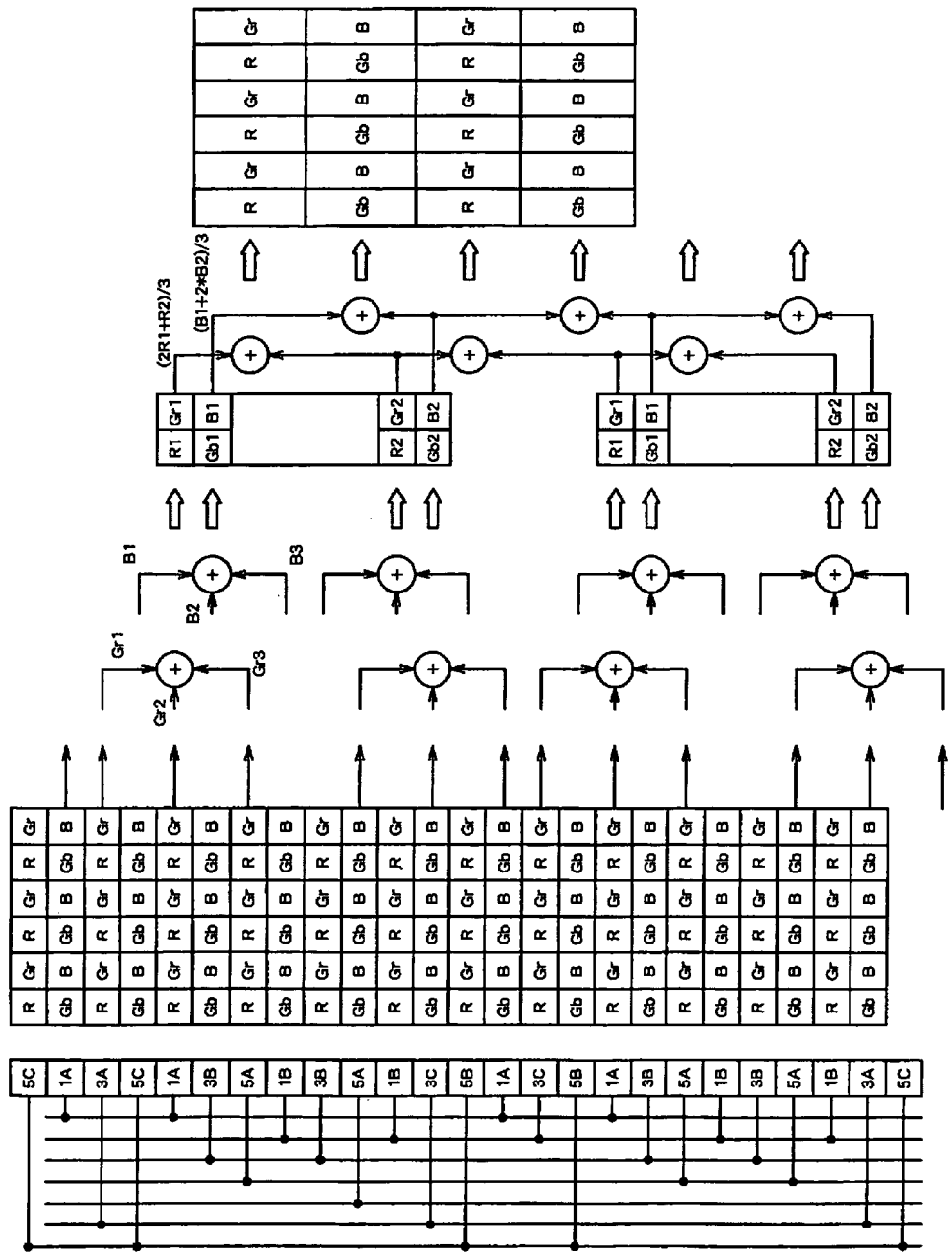
FIG. 3 is a diagram for explaining another reading process from a CCD.

FIG. 3 shows a second reading method from the CCD 12. This method corresponds to the case in which the pixels are added along the vertical direction and the data are read in order to improve the sensitivity of the CCD 12, but the reading method differs from the first reading method. More specifically, in FIG. 2, with regard to the B pixel, a pixel B2 positioned below a pixel Gr2, a pixel B3 positioned bellow a pixel Gr3, and a pixel B4 positioned below a pixel Gr4 are added and are read, but in FIG. 3, a pixel B1 positioned below a pixel Gr1, the pixel B2 positioned below the pixel Gr2, and the pixel B3 positioned below the pixel Gr3 are added and read. Because of this configuration, after the pixels are added along the vertical direction, the median point of the Gr pixel and the R pixel and the median point of the Gb pixel and the B pixel are not arranged equidistantly, and a deviation occurs. The filter median point movement filter 18 operates in such a case, and moves the median point of the input pixel signal. Specifically, for the row of the R pixel and the Gr pixel, when the R pixels are R1 and R2 and the Gr pixels are Gr1 and Gr2, new pixels R1' and Gr1' are generated by:

$$R1'=(2R1+R2)/3$$

$$Gr1'=(2Gr1+Gr2)/3$$

In addition, when the B pixels are B1 and B2 and the Gb pixels are Gb1 and Gb2, new pixels B1' and Gb1' are generated by:

$$B1'=(B1+2B2)/3$$

$$Gb1'=(Gb1+2Gb2)/3$$

With these calculations, the median point of the Gr pixel and the R pixel and the median point of the Gb pixel and the B pixels are equidistantly arranged. Similar calculations are repeated for other pixels. The positions of median points are moved because the process becomes complicated if the positions of the median points are not equidistant during noise processing and interpolation process at the later stages, because these processes takes into consideration the peripheral pixels.

Next, the sigma (Σ) noise filter 22 in FIG. 1 will be described.

Figure 4:
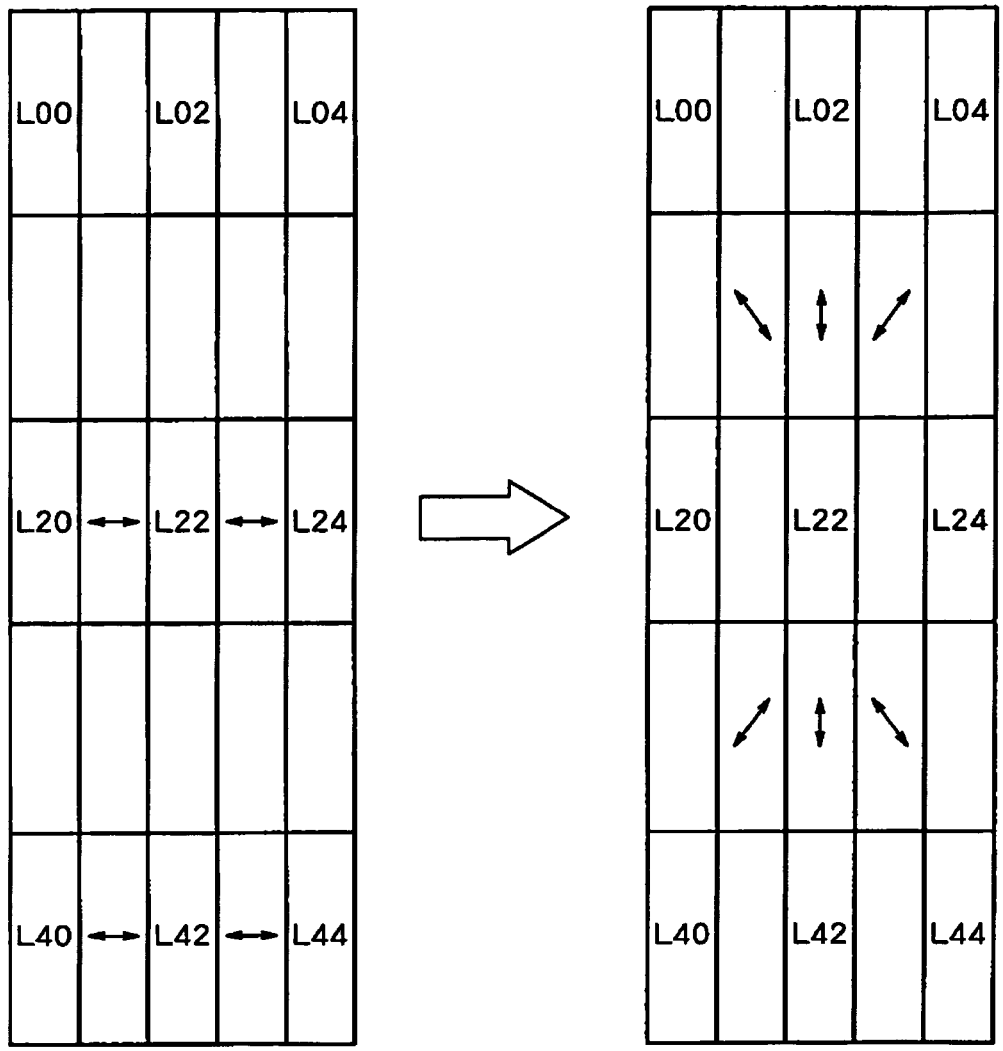
FIG. 4 is a diagram for explaining an operation of a sigma ($\Sigma$) noise filter.

FIG. 4 shows an operation of the Σ noise filter 22. A pixel to be processed is L22, and 8 pixels L00-L44 exist at the periphery of the pixel L22 to be processed. In the conventional noise filter, the pixel L22 to be processed is compared with each of the peripheral pixels L00-L44, a pixel value of the peripheral pixel is sequentially added to an initial value (for example, 1.22) and a count value is incremented by 1 when the difference in the pixel values is smaller than a predetermined noise level N, and the added result is divided by the count value C at the end, to remove the noise. In the present embodiment however, as shown in FIGS. 2 and 3, the pixel after the pixel addition has differing resolution between the horizontal and vertical directions, and thus the noise cannot be reliably removed with the conventional method. For example, the peripheral pixels L02 and L42 along the vertical direction with respect to the pixel L22 to be processed should have a smaller degree of influence on the pixel L22 than the peripheral pixels L20 and L24 along the horizontal direction. In consideration of this, the sigma noise filter 22 in the present embodiment operates in the following manner. An initial condition including AVG (original pixel value of the pixel L22) and a count value C of 1 is set, and first, the peripheral pixels L20 and L24 along the horizontal direction are compared with the pixel L22 to be processed. Specifically, a difference value of (L22−L20) and a difference value of (L22−L24) are calculated, and it is determined whether or not each of absolute values of the difference values is smaller than a predetermined noise level N. When the absolute value of the difference value is smaller than the predetermined noise level N, the peripheral pixel is added to AVG and the count value C is incremented by 1. For example, when the absolute value of the difference value of (L22−L20) is smaller than the noise level N, L20 is added to AVG.

After the comparison with the peripheral pixels L20 and L24 along the horizontal direction, the pixel L22 to be processed is compared with peripheral pixels along directions other than the horizontal direction. More specifically, difference values (L22−Lxx) (Lxx=L00, L02, L04, L40, L42, L44) are sequentially calculated, and it is determined whether or not the absolute value of the difference value is smaller than a predetermined noise level N/2. Here, it should be noted that the value with which the absolute value of the difference value is to be compared is not N, but rather is N/2 which is smaller than N. Because the resolution in the vertical direction is lower compared to the resolution of the horizontal direction, the degree of influence or degree of correlation to the pixel L22 to be processed is small, and thus the noise level with which the absolute value of the difference value is to be compared is set at a smaller value. When the absolute value of the difference value is smaller than the noise level N/2, the peripheral pixel is added to AVG and the count value is incremented by 1, and AVG obtained through the addition is divided by the count value C at the end to calculate an ultimate average value. The setting of the noise level which is a threshold value for the determination to a smaller value is equivalent to setting a weight of the peripheral pixel along the vertical direction to be smaller than a weight of the peripheral pixel along the horizontal direction.

With the above-described process, for example, when the difference value between the pixels L22 and L20 is smaller than the noise level N and the difference values between the pixels L22 and L40 and between the pixels L22 and L42 are smaller than the noise level N/2 among pixels L00-L44, a new pixel value of the pixel L22 is calculated with AVG=(1.22+L20+L40+L42)/4.

Next, an operation of the median noise filter 28 in FIG. 1 will be described.

Figure 5:
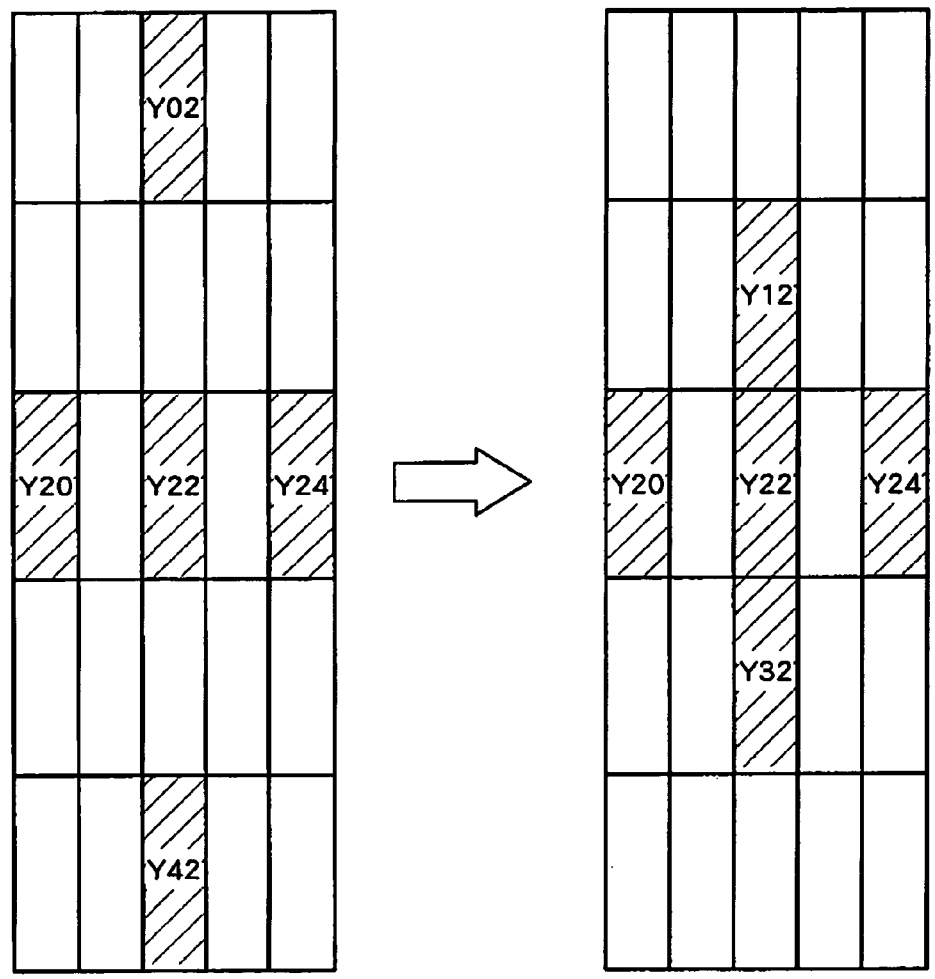
FIG. 5 is a diagram for explaining an operation of a median noise filter.
Figure 6:
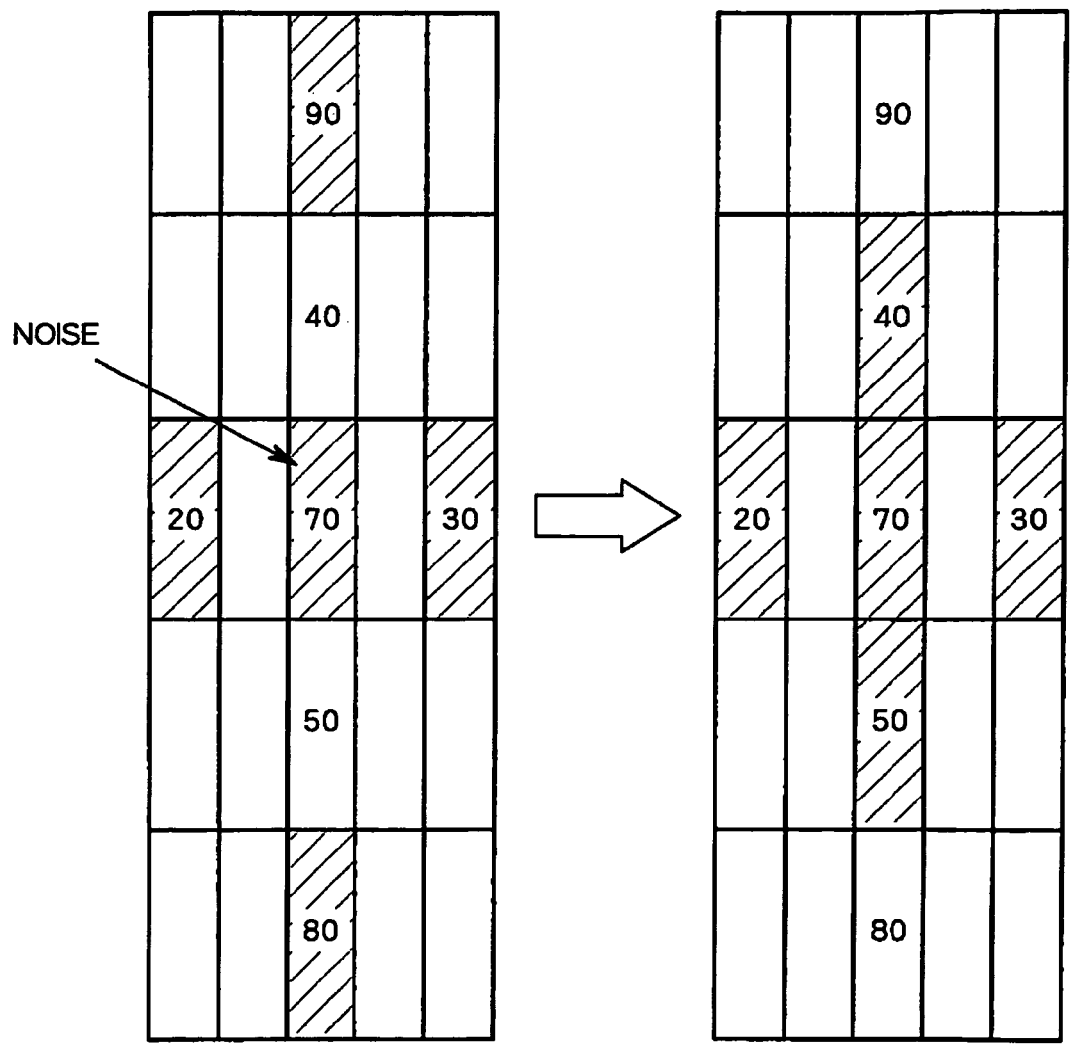
FIG. 6 is a diagram for explaining an operation of a median noise filter.
Figure 7:
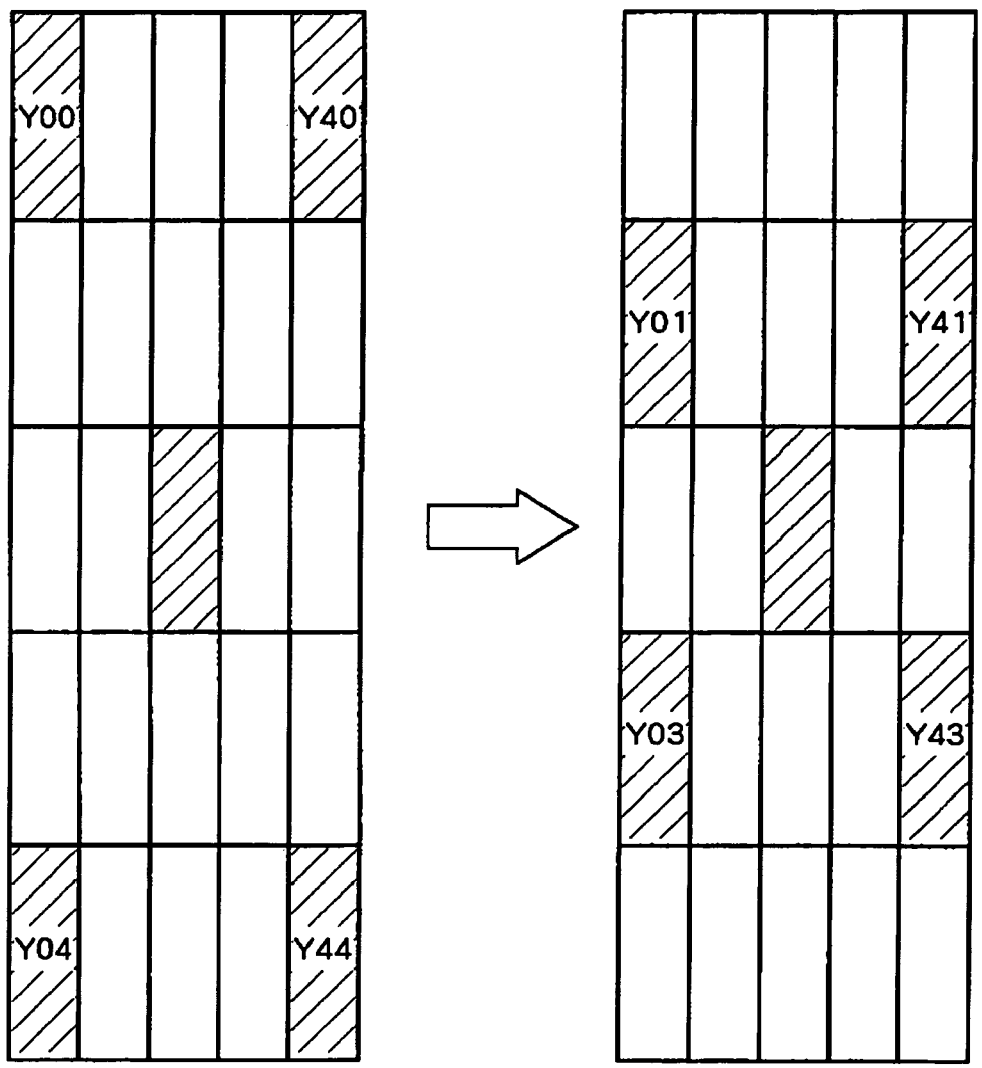
FIG. 7 is a diagram for explaining an operation of a median noise filter.

FIGS. 5-7 show an operation of the median noise filter 28. The median noise filter 28 normally removes noise by replacing a pixel to be processed with a median of the peripheral pixels. However, as described above, because the resolution of pixels after the pixel addition in the present embodiment differs between the horizontal direction and the vertical direction, the noise cannot be reliably removed with the conventional method. In consideration of this, in the median noise filter 28 of the present embodiment, as shown in FIG. 5, when a pixel Y22 to be processed is to be replaced by a median using a total of 4 pixels including 2 peripheral pixels along the horizontal direction and two peripheral pixels along the vertical direction, peripheral pixels Y20 and Y24 along the horizontal direction are used without a modification, but with regard to the vertical direction, pixels Y12 and Y31 which are closer to the pixel Y22 to be processed are used in place of the pixels Y02 and Y42 for calculation of the median. In other words, instead of calculating the median using pixels Y02, Y42, Y20, and Y24, the median is calculated using the pixels Y12, Y32, Y20, and Y24. Although the resolution in the vertical direction is lower than the resolution in the horizontal direction, by using, as the peripheral pixels along the vertical direction, pixels which are closer to the pixel to be processed, it is possible to compensate for the lower resolution in the vertical direction. In other words, although a peripheral pixel which is distanced from the pixel to be processed by a pixel spacing (spacing in units of pixels) of one pixel is used along the horizontal direction, the peripheral pixel which is adjacent in the pixel spacing to the pixel to be processed is used along the vertical direction, so that different pixel spacings, from the pixel to be processed, of the peripheral pixels to be used in the process are used along the horizontal direction and the vertical direction, with the pixel spacing between the pixel to be processed and the peripheral pixel along the vertical direction being smaller. By not employing, as the peripheral pixels along the vertical direction, the peripheral pixels which are distanced similarly to the pixels along the horizontal direction, it is possible to improve the precision of noise removal. FIG. 6 shows an example configuration. As shown in FIG. 6, when Y22=70 Y02=90, Y12=40, Y32=50, Y42=80, Y20=20, and Y24=30, the median of the brightness value of a total of 5 pixels including Y22 is 70 when Y02, Y20, Y42, and Y24 are used as the peripheral pixels, and noise cannot be removed. This is because Y02 and Y42 having small correlation with Y22 is included. However, when Y12, Y20, Y32, and Y24 are used as the peripheral pixels, the median of the 5 brightness values is 40, and the noise in Y22 can be removed.

In a case where the median noise filter 28 applies a process to replace the pixel to be processed by a median using 4 peripheral pixels positioned along the diagonal directions as shown in FIG. 7, the noise can also be reliably removed with the use of, with regard to the vertical direction, pixels which are closer to the pixel to be processed. In other words, in this configuration, the median is calculated using Y01 in place of Y00, Y41 in place of Y40, Y03 in place of Y04, and Y43 in place of Y44.

Next, an operation of the CFA interpolation unit 24 of FIG. 1 will be described.

FIGS. 8-12 show an operation of the CFA interpolation unit 24. The CFA interpolation unit 24 interpolates the R pixel signal, G pixel signal, and B pixel signal which are output from the CCD 12 having the color filter array of Bayer arrangement.

Figure 8:
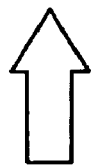
FIG. 8 is a diagram for explaining interpolation of a G pixel.

FIG. 8 shows an interpolation operation of the G pixel. As described above, the G pixel includes the Gr pixel and the Gb pixel. In the present embodiment, because the pixels are added along the vertical direction, the resolution in the vertical direction is lower than the resolution in the horizontal direction. Therefore, when the G pixel is to be interpolated, the pixel is interpolated using only the peripheral pixels along the horizontal direction. For example, with regard to the Gr pixel, two Gr pixels adjacent to the pixel to be interpolated along the horizontal direction are added (average is calculated) to interpolate the Gr pixel. Similarly, for Gb pixels, two Gb pixels adjacent to the pixel to be interpolated along the horizontal direction are added (average is calculated) to interpolate the pixel. In the Gr pixel and the Gb pixel, the peripheral pixels positioned along the vertical direction are not included.

Figure 9:
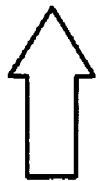
FIG. 9 is a diagram for explaining interpolation of an R pixel.
Figure 10:
FIG. 10 is a diagram for explaining a process of an interpolated G pixel.
Figure 11:
FIG. 11 is a diagram for explaining interpolation of an R pixel.

FIGS. 9-11 show an interpolation operation of the R pixel. When the R pixel is to be interpolated, in consideration of the fact that the resolution in the vertical direction is lower than the resolution in the horizontal direction similar to the G pixel, the pixel is first interpolated using only the peripheral pixels along the horizontal direction. FIG. 9 shows an interpolation by adding (calculating average of) two R pixels adjacent to the pixel to be interpolated along the horizontal direction. However, the interpolation of the R pixel is not sufficient with this process, because there is a "vacancy" along the vertical direction. In the present embodiment, the pixel interpolation of the R pixel along the vertical direction is executed using the correlation of G pixels in the periphery in addition to the peripheral R pixels. Specifically, the G pixels are already interpolated by addition of the peripheral pixels along the horizontal direction as shown in FIG. 8. When the R pixels are to be interpolated along the vertical direction, the correlation of the G pixel which is already interpolated is used, so that the R pixels are interpolated along the vertical direction to match the correlation of the G pixel. There is a possibility, however, that the interpolated G pixel shown in FIG. 8 includes noise, and that the noise in the G pixel may be transferred to the R pixel if the G pixel is used without any processing. Therefore, as shown in FIG. 10, prior to interpolation of the R pixels along the vertical direction using the correlation of the G pixel, a median noise filter in the vertical direction is used to remove noise in the vertical direction of the interpolated G pixels. For example, when Gr1=54, Gb1=14, and Gr2=62 exist on the same column as the interpolated G pixel, a median of the three pixels along the vertical direction is calculated, and the value of Gb1 is replaced. If the replaced Gb1 is Gb1', Gb1'=54 and the noise in the vertical direction is removed. Similarly, Gr2'=52. After the noise in the vertical direction of the interpolated G pixels is removed in this manner, the R pixels are interpolated along the vertical direction.

FIG. 11 shows an interpolation operation of the R pixel along the vertical direction. When the pixel to be interpolated is R and the peripheral pixels along the vertical direction are R1 and R2, the pixel is interpolated by:

$$R=Gb1'+\{(R1-Gr1')+(R2-Gr2')\}/2$$

As is clear from this equation, the interpolation of the R pixel along the vertical direction uses not only R1 and R2, but also Gr1', Gr2', and Gb1' of the G pixels.

Figure 12:
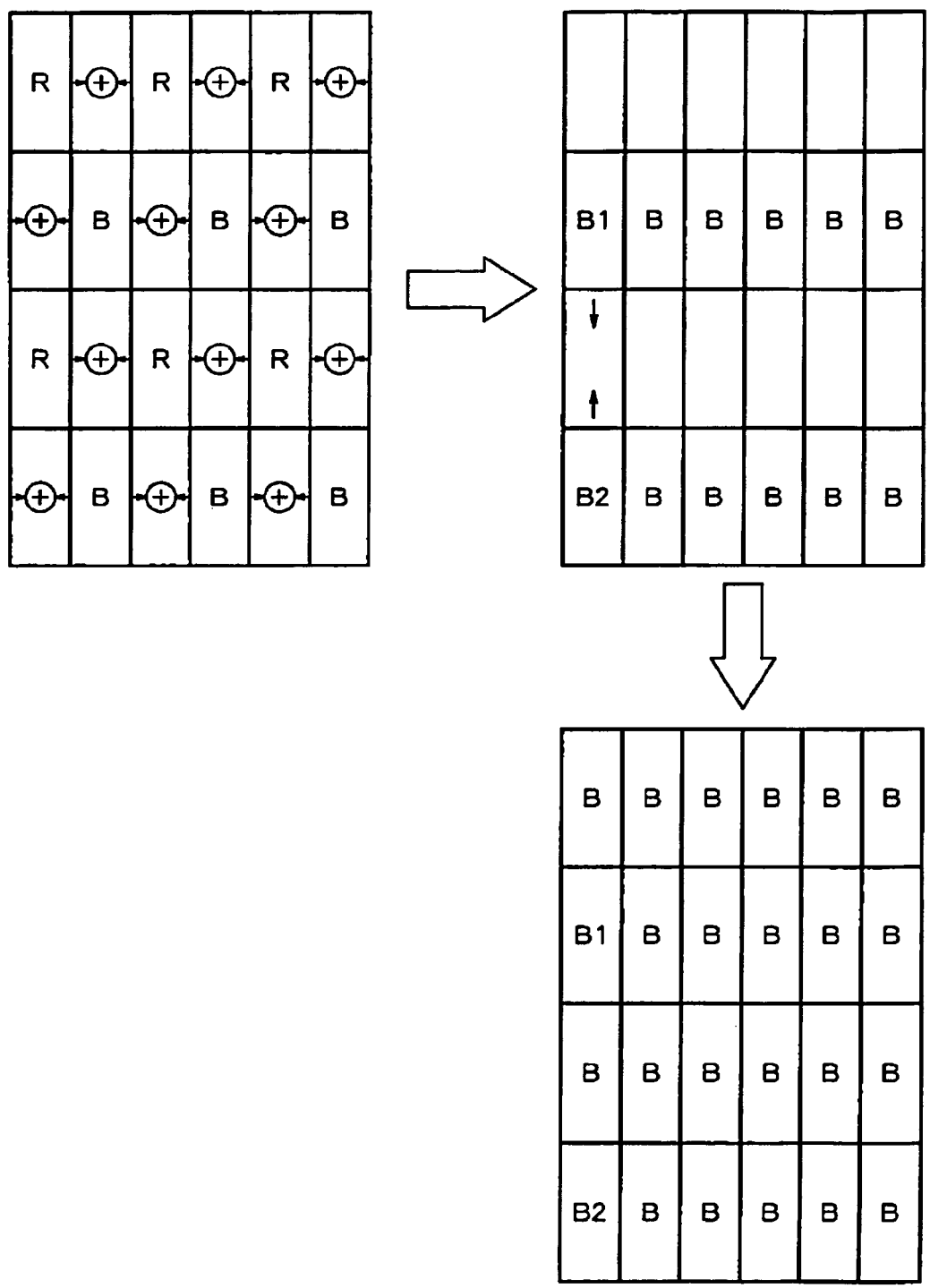
FIG. 12 is a diagram for explaining interpolation of a B pixel.

FIG. 12 shows an interpolation operation of the B pixel. The interpolation of the B pixel is similar to the interpolation of the R pixel. In other words, the B pixels are interpolated using only the peripheral pixels along the horizontal direction, and then the B pixels are interpolated along the vertical direction using the correlation of the interpolated G pixel. When the interpolated G pixel is used, the noise in the interpolated G pixel along the vertical direction is removed using the median filter along the vertical direction prior to the use of the interpolated G pixel. When the pixel to be interpolated is B and the peripheral pixels along the vertical direction are B1 and B2, the pixel is interpolated by:

$$B=Gr2'+\{(B1-Gb1')+(B2-Gb2')\}/2$$

Gr2', Gb1', and Gb2' are pixel values of interpolated G pixels after passing through the median filter in the vertical direction.

As described, in the present embodiment, when pixels are added along the vertical direction in order to improve sensitivity of the CCD 12, the degree of influence of the peripheral pixels along the vertical direction is reduced, or pixels along the vertical direction which are closer to the pixel to be processed in the noise processing in the noise filter and pixel interpolation process are employed. With this structure, the precision of the noise process and the interpolation process can be improved.

In the present embodiment, an example configuration is described in which the pixels are added along the vertical direction, but a configuration in which the pixels are added along the horizontal direction can be treated in a similar manner. In this case, the horizontal direction in the present embodiment may be interpreted to be the vertical direction and the vertical direction in the present embodiment may be interpreted to be the horizontal direction.

In addition, the vertical direction of the present embodiment may be interpreted to be a perpendicular direction and the horizontal direction may be interpreted to be a direction orthogonal to the perpendicular direction. The horizontal and vertical directions when the digital camera is set at a vertical orientation for imaging and at a horizontal orientation for imaging are the perpendicular direction and the direction orthogonal to the perpendicular direction (horizontal direction), respectively.

Figure 13:
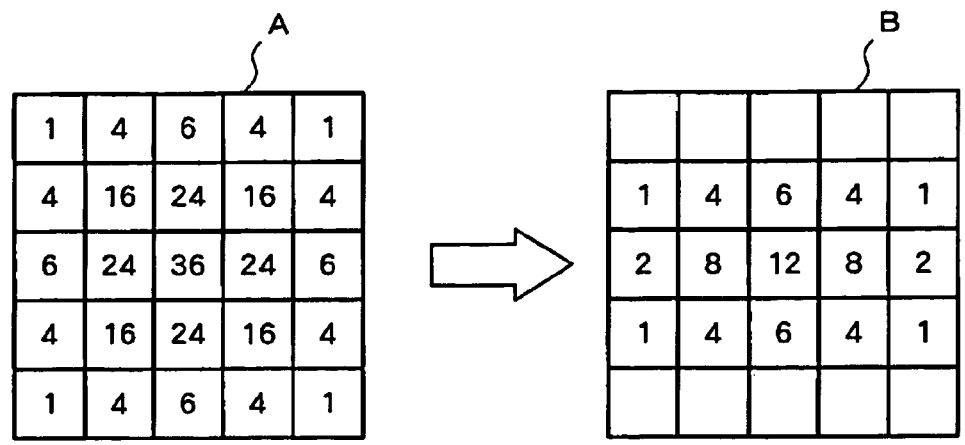
FIG. 13 is a diagram for explaining a coefficient of a chroma noise filter.

Moreover, with regard to the operation of the chroma noise filter (low pass filter) 34 of the present embodiment also, by adjusting the weight in the vertical direction, it is possible to apply noise processing in consideration of the lower resolution in the vertical direction. FIG. 13 shows an example of a filter coefficient of the chroma noise filter 34. In FIG. 13, a filter A has a conventional coefficient and a filter B has a filter coefficient of the present embodiment.

Figure 14:
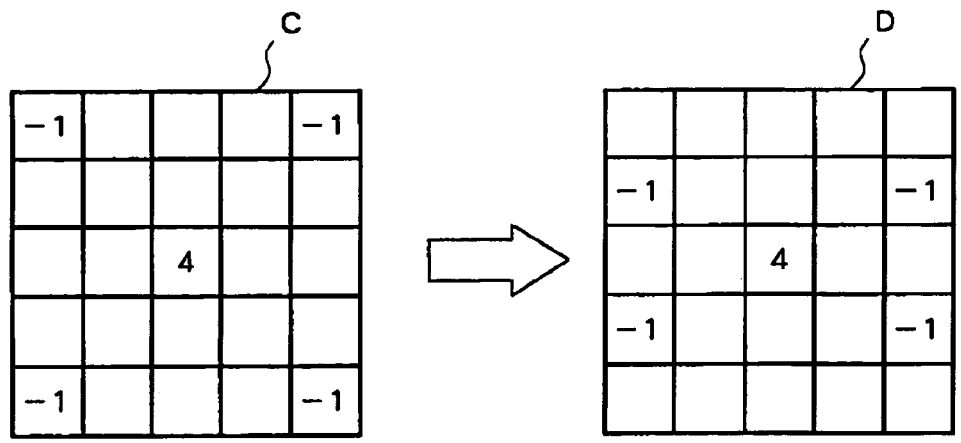
FIG. 14 is a diagram for explaining a coefficient of an edge processing unit.

Similarly, with regard to the operation of the edge processing unit 30 of the present embodiment also, an edge enhancing process in consideration of the lower resolution in the vertical direction can be executed by adjusting the weight along the vertical direction. FIG. 14 shows an example of a filter coefficient of the edge processing unit 30. In FIG. 14, a filter C has a conventional coefficient and a filter D) has a filter coefficient of the present embodiment. With regard to the vertical direction, an edge enhancement process is executed using pixels which are closer to the pixel to be processed.

PARTS LIST

10 lens
12 CCD
14 CDS
16 A/D
18 movement filter
20 image memory
22 noise filter
24 interpolation unit
26 conversion unit
28 median noise filter
30 edge processing unit
34 chroma noise filter
36 RGB conversion unit
38 correction unit
40 conversion unit
42 adder
44 LCD
46 image memory
48 timing generator
50 memory controller
52 compression and extension circuit
54 recording medium
56 operation unit
58 CPU

What is claimed is:

1. An imaging device comprising:
an imaging element;
a reading unit which reads a pixel signal from the imaging element while adding a plurality of pixel signals along a horizontal direction or a vertical direction, and outputs the pixel signal which is read, as an R pixel signal, a G pixel signal, and a B pixel signal; and
a noise filter unit which removes noise in the R pixel signal, the G pixel signal, and the B pixel signal, or noise in a brightness signal generated from the R pixel signal, the G pixel signal, and the B pixel signal, by using a peripheral pixel of a pixel to be processed, the noise filter unit setting a pixel spacing between a peripheral pixel and the pixel to be processed smaller in a direction of addition among the horizontal direction and the vertical direction than in a direction which is not the direction of addition among the horizontal direction and the vertical direction.

2. The imaging device according to claim 1, wherein the noise filter unit is a median filter.

3. The imaging device according to claim 1 comprising:
a conversion unit which converts the R pixel signal and the B pixel signal, when, among the R pixel signal, the G pixel signal, and the B pixel signal output from the reading unit, a spacing of the R pixel signals and a spacing of the B pixel signals are not equal to each other in the direction of addition among the horizontal direction and the vertical direction, such that the spacings are equal to each other.

\* \* \* \* \*